US009465616B2

(12) United States Patent
Jacobs

(10) Patent No.: US 9,465,616 B2
(45) Date of Patent: Oct. 11, 2016

(54) INSTRUCTION CACHE WITH WAY PREDICTION

(71) Applicant: Synopsys, Inc., Mountain View, CA (US)

(72) Inventor: Eino Jacobs, Belmont, CA (US)

(73) Assignee: Synopsys, Inc., Mountain View, CA (US)

( * ) Notice: Subject to any disclaimer, the term of this patent is extended or adjusted under 35 U.S.C. 154(b) by 267 days.

(21) Appl. No.: 14/507,787

(22) Filed: Oct. 6, 2014

(65) Prior Publication Data

US 2015/0100762 A1    Apr. 9, 2015

Related U.S. Application Data

(60) Provisional application No. 61/887,441, filed on Oct. 6, 2013.

(51) Int. Cl.
*G06F 15/00* (2006.01)
*G06F 9/30* (2006.01)
*G06F 9/38* (2006.01)
*G06F 12/08* (2016.01)

(52) U.S. Cl.
CPC ........... *G06F 9/3808* (2013.01); *G06F 9/3861* (2013.01); *G06F 12/0862* (2013.01); *G06F 12/0864* (2013.01); *G06F 12/0875* (2013.01); *G06F 2212/452* (2013.01); *G06F 2212/6028* (2013.01)

(58) Field of Classification Search
None
See application file for complete search history.

(56) References Cited

U.S. PATENT DOCUMENTS

| 2002/0161976 | A1* | 10/2002 | Ito ....................... G06F 12/0855 711/128 |
| 2003/0014597 | A1* | 1/2003 | van de Waerdt ... G06F 12/0864 711/136 |
| 2009/0119487 | A1* | 5/2009 | Hosoda ................... G06F 9/381 712/205 |
| 2009/0198985 | A1* | 8/2009 | Levenstein ........... G06F 9/3806 712/240 |

* cited by examiner

*Primary Examiner* — Hyun Nam
(74) *Attorney, Agent, or Firm* — Fenwick & West LLP

(57) ABSTRACT

A processor includes an instruction fetch unit and an execution unit. The instruction fetch unit retrieves instructions from memory to be executed by the execution unit. The instruction fetch unit includes a branch prediction unit which is configured to predict whether a branch instruction is likely to be executed. The memory includes an instruction cache comprising a portion of the fetch blocks available in the memory. The instruction fetch unit may use a combination of way prediction and serialized access to retrieve instructions from the instruction cache. The instruction fetch unit initially accesses the instruction cache to retrieve the predicted fetch block associated with a way prediction. The instruction fetch unit compares a cache tag associated with the way prediction with the address of the cache line that includes the predicted fetch block. If the tag matches, then the way prediction is correct and the retrieved fetch block is valid.

19 Claims, 6 Drawing Sheets

INSTRUCTION CACHE WITH WAY PREDICTION

CROSS REFERENCE TO RELATED APPLICATIONS

This application claims the benefit of U.S. Provisional Application No. 61/887,441, filed Oct. 6, 2013, which is incorporated by reference in its entirety.

BACKGROUND

The present disclosure relates to a processor system and related components used in such a system.

Factors such as the frequency with which information is retrieved from memory and the number of cycles to execute program elements make power consumption a constraint on processor operation. Additionally, latency caused by a number of cycles to fetch instructions from memory and look-up instructions in memory further constrains processor operation.

BRIEF DESCRIPTION OF THE DRAWINGS

The teachings of the embodiments herein can be readily understood by considering the following detailed description in conjunction with the accompanying drawings.

OVERVIEW

Figure 1:
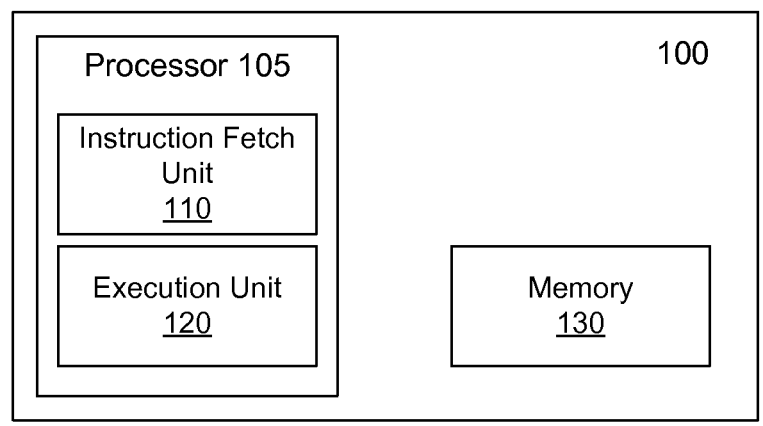
FIG. 1 is a block diagram of a processor system including an instruction fetch unit and an execution unit, according to one embodiment.

A processor includes an instruction fetch unit and an execution unit. The instruction fetch unit retrieves instructions from memory to be executed by the execution unit. The instruction fetch unit includes a branch prediction unit which is configured to predict whether a branch instruction is likely to be taken or not taken and, if taken, what the target address is of that branch instruction. In one embodiment, the memory includes an instruction cache comprising a portion of the fetch blocks available in the memory. Groups of fetch blocks are included in the instruction cache to reduce latency, i.e., the instruction fetch unit takes less time to access the instruction cache than to access the memory module.

For systems using a set-associative instruction cache, the branch prediction unit provides a "way prediction" for the predicted fetch blocks. Way prediction is the prediction in which "way" or set element of a set-associative cache a fetch block is stored. The instruction fetch unit may use a combination of way prediction (also called parallel mode access) and serialized access to retrieve instructions from the instruction cache. In one embodiment, the instruction fetch unit initially accesses the instruction cache to retrieve the predicted fetch block associated with a way prediction. At the same time (during the same clock cycle) the instruction fetch unit compares a cache tag associated with the way prediction with the address of the cache line that contains the predicted fetch block. If the tag matches, then the way prediction is correct and the retrieved fetch block is valid. If the tag doesn't match then the way prediction is incorrect, the retrieved fetch block is invalid and the instruction cache access is repeated using serialized access.

When a branch prediction is made the processor also makes a way prediction both for the taken and the not taken direction of the branch. And thus, when a branch misprediction occurs the processor may use the way prediction for the other direction (i.e., the alternative way prediction) to restart the processor from the location in the instruction cache with the alternative way. In one embodiment, when a branch misprediction occurs, the processor determines whether the alternative way prediction is known when the branch prediction was made. When a branch prediction is made, the processor stores the alternative way prediction in a memory location or a hardware queue if the alternative way prediction is known. If the alternative way prediction is not known, then the processor restarts the instruction fetch at the corrected branch target address using serialized mode. Thus, as long as the way prediction is correct or even if incorrect and an alternative way prediction is known, fetch blocks can be retrieved in one cycle, thereby reducing memory latency. Hence, way prediction in combination with alternative way prediction may reduce the cycles used to access the instruction cache to a single cycle in certain circumstances.

DETAILED DESCRIPTION OF EMBODIMENTS

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments of the present disclosure relate to components and methods for fetching instructions as executed by a processor. FIG. 1 is a block diagram of one embodiment of a processor pipeline system 100 including a processor 105 and a memory module 130. The processor 105 executes a program by retrieving instructions that comprise the program from the memory 130 and executing actions described by the retrieved instructions. The processor 105 may be programmed to operate as a reduced instruction set computing (RISC) processor, digital signal processor (DSP), graphics processor unit (GPU), applications processor (e.g., a mobile application processor), video processor, or a central processing unit (CPU) to access memory map, and exchange commands with other computing devices. In some embodiments, the processor 105 includes a pipeline. The pipeline includes multiple data processing stages connected in series. The processor 105 may be a single or multiple processor cores represented in an electronic format. In one example, the processor 105 is a configurable processor core represented in circuit description language, such as register transfer language (RTL) or hardware description language (HDL). In another example the processor 105 may be represented as a placed and routed design or design layout format (e.g., graphic data system II or GDS II).

In one embodiment, the processor 105 includes an instruction fetch unit 110 and an execution unit 120. An instruction fetch unit 110 fetches an instruction from memory 130 and issues it to the execution unit 120 that executes the fetched instruction. Each instruction represents a process or function (as part of a program execution path). For example, a branch instruction conditionally instructs the processor to execute a different instruction that may not be sequential to the branch instruction. The instruction identified to be executed by the branch instruction may be included in a different fetch block than the branch instruction itself; hence, a branch instruction allows the processor to skip execution of instructions in a program or instruction run based on a qualifying condition being satisfied.

The memory 130, in one example, stores instructions that represent a process or function as part of a program execution path. The memory 130 may include an instruction cache for storing instructions or blocks or a plurality of instructions to be accessed by the instruction fetch unit 110.

Figure 2:
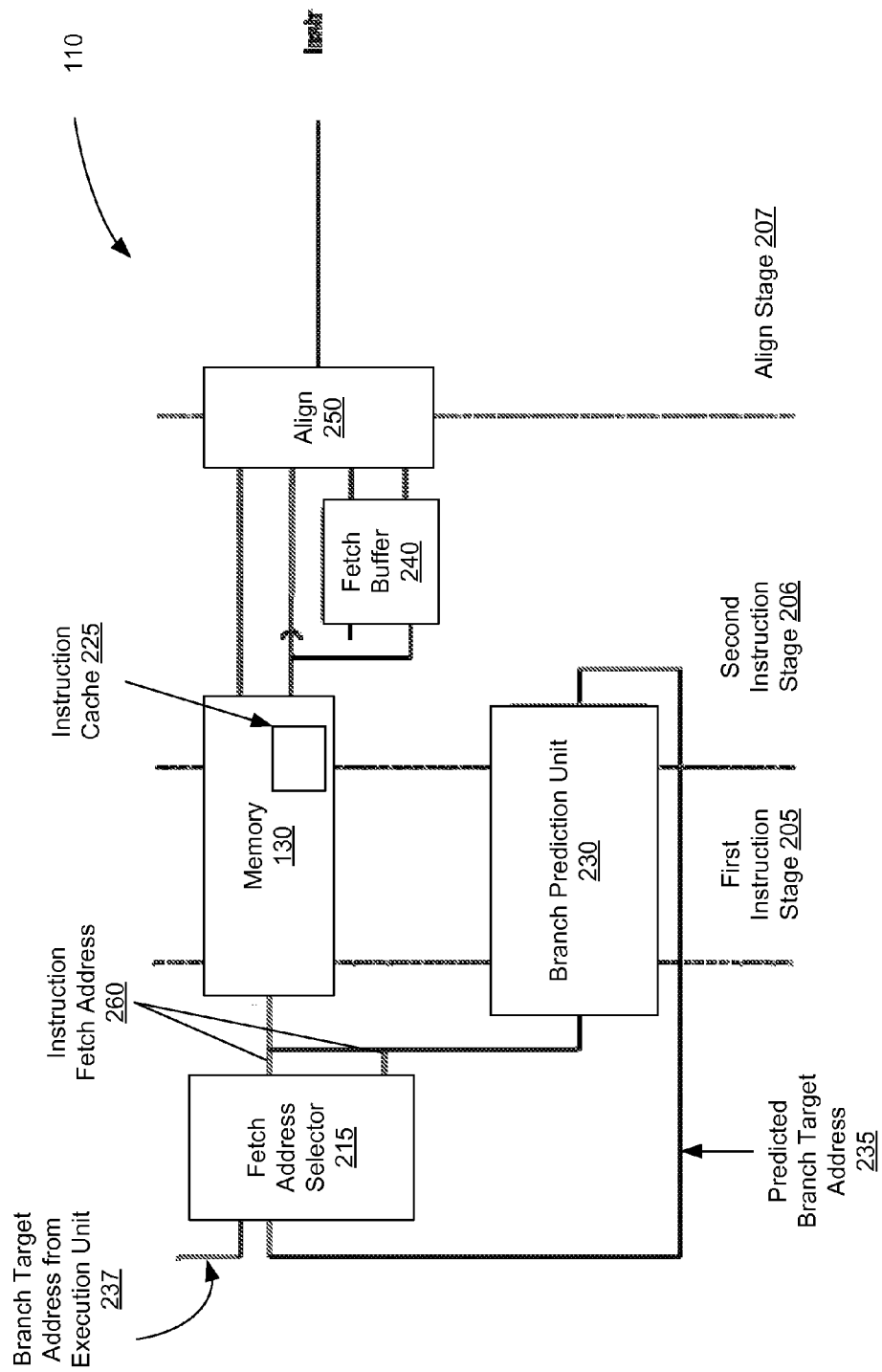
FIG. 2 is a block diagram of an expanded view of the instruction fetch unit from FIG. 1, according to one embodiment.

FIG. 2 is a block diagram of expanded view of one embodiment of the instruction fetch unit 110. In the embodiment of FIG. 2, the instruction fetch unit 110 includes a fetch address selector 215, branch prediction unit 230, a fetch buffer 240 and an align block 250. The instruction fetch unit 110 may operate in three cycles and includes three pipeline stages: a first instruction stage 205, a second instruction stage 206, and an align stage 207. During the first instruction stage 205 and the second instruction stage 206, the instruction fetch unit 110 retrieves one or more instructions from a location in memory 130 or an instruction cache 225, as described with reference to FIG. 2, and the branch prediction unit 230. Retrieval of the one or more instructions consumes two cycles to allow high-speed processor operation. During the third stage, the align block 250 in the instruction fetch unit 110 aligns the retrieved one or more instructions. The aligned one or more instructions are then communicated to the execution unit 120. In another embodiment, different numbers of cycles may be taken to retrieve one or more instructions and/or to align the retrieved instructions. For example, either single cycle or multi-cycle memories may be used for on-chip instruction memories. Multi-cycle memories are useful when the on-chip SRAM (static random access memory) speed cannot catch up with the processor core speed. A multi-cycle memory is a memory having N cycles to read or write data, where N is an integer greater than or equal to 2.

Figure 3:
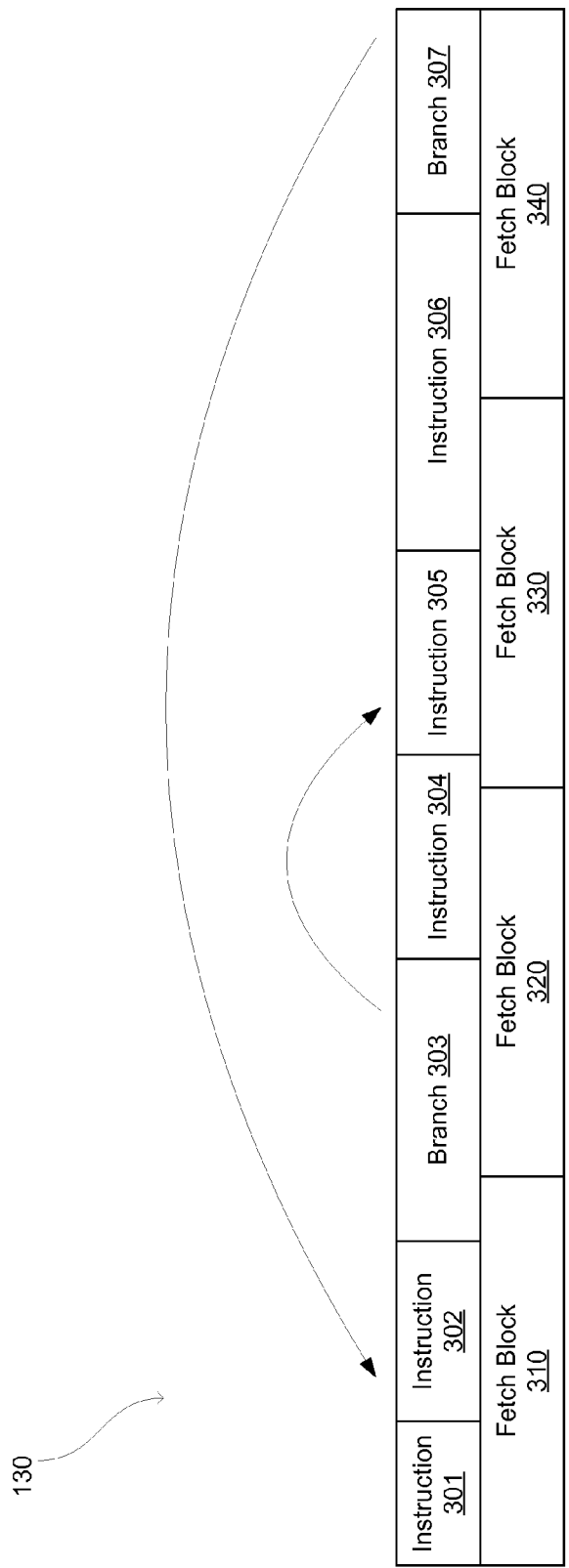
FIG. 3 is an example of fetch blocks and unaligned instructions, according to one embodiment.

In one embodiment, the memory 130 includes a plurality of fetch blocks, with each fetch block including a group of stored and unaligned instructions. An example of a fetch block is shown by FIG. 3. Instructions may have variable lengths and can exist across the boundary of two fetch blocks. Based on the kind of an instruction, an instruction may occupy, one fetch block, or a part or a whole of additional fetch blocks. In the example of FIG. 3, fetch block 310 includes instruction 301, instruction 302, and a portion of branch instruction 303. Fetch block 320 includes the remaining portion of branch instruction 303 and a portion of instruction 304. Fetch block 330 includes the remaining portion of instruction 304, instruction 305, and a portion of instruction 306. Fetch block 340 includes the remaining portion 306 and includes branch instruction 307.

Prior to execution, an entire instruction is fetched from its respective fetch blocks. For example, prior to the execution of instruction 306, the portions of instruction 306 included in both fetch blocks 330 and 340 needs to be fetched. In one embodiment, the alignment block 250 aligns instructions, by ensuring that the entire instruction has been fetched from its respective fetch blocks prior to forwarding the instruction to the execution unit 120. An instruction run is a sequence of instructions that terminates with a taken branch and that may include branches that are not taken. The instruction run has an entry point corresponding to the initial instruction in the instruction run in a fetch block and an exit point, which is an instruction to branch, in the same or a different, sequential fetch block. In the example of FIG. 3, instruction 302 has an entry point in fetch block 310, and an instruction run including instruction 302 has an exit point out of fetch block 320 based on a branch instruction 303 to branch to instruction 305. Because of the branch instruction 303, the instruction run has an entry point into fetch block 330, which includes instruction 305. The instruction run continues by executing instruction 306, and has an exit point out of fetch block 340 because of the branch instruction 307 to branch to instruction 302.

Returning to FIG. 2, in one embodiment, a portion of the fetch blocks available in the memory 130 are included in an instruction cache 225. Groups of fetch blocks are included in the instruction cache 225 to reduce latency, i.e., the instruction fetch unit 110 takes less time to access the instruction cache 225 than to access the memory module 130. In one embodiment, the instruction fetch unit 110 initially attempts to retrieve an instruction or a portion of the instruction run by accessing the instruction cache 225, and accesses the memory 130 to identify one or more fetch blocks including the instruction or the portion of the instruction run if the instruction or the portion of the instruction run is not included in the instruction cache 225. After identifying the one or more fetch blocks including the instruction or the portion of the instruction run, the instruction fetch unit 110 moves the identified one or more fetch blocks to the instruction cache 225 to reduce the latency of subsequent instruction retrieval.

The instruction fetch unit 110 may retrieve instructions from the instruction cache 225 or the memory module 130 using an instruction fetch address 260, which specifies an address in memory 130 or in the instruction cache 225 that includes data representing an instruction. In one embodiment, each fetch address 260 is selected by the fetch address selector 215 from sources that include: a branch target address 237 obtained from the execution unit 120, a predicted branch target address 235 from the branch prediction unit 230 and a sequential next address from an address incrementer included within the fetch address selector 215. Additional addresses that are reused from an earlier cycle may also be used to generate the fetch address.

In one embodiment, the memory 130 or the instruction cache 225 is coupled to a fetch buffer 240, which may be bypassed. The fetch buffer 240 stores blocks of instructions retrieved from memory 130 before the instructions are communicated to the align block 250, which aligns the instructions for execution. This ensures that a compatible interface is present between the steps of predicting instructions, fetching instructions and aligning instructions.

In one embodiment the branch prediction unit 230 executes in parallel with retrieval of one or more fetch blocks from memory 130 or the instruction cache 225. The branch prediction unit 230 predicts sequences of different instruction runs and the fetch blocks associated with the different instruction runs. Hence, the branch prediction unit 230 identifies one or more groups of fetch blocks that represent a path of executing instructions. For example, the branch prediction unit 230 predicts whether a fetch block includes a branch taken by an instruction in an instruction run. If the fetch block is predicted to include a branch taken by an instruction in the instruction run, the branch prediction unit 230 provides the instruction fetch unit 110 with a predicted branch target address 235, which identifies a location in memory 130 of the next instruction that the branch taken by the instruction causes to be executed. Hence, the branch target address is the fetch address for the instruction fetch unit 110 when the branch is predicted to be taken.

If the fetch block is not predicted to include a branch taken by an instruction in the instruction run, the branch prediction unit 230 retrieves an additional sequential fetch block by incrementing a current instruction fetch address 260 by a fetch block size. Based on the stored prediction information, the branch prediction unit 230 predicts sequences of different instruction runs. As the branch prediction unit 230 relies on the prediction information present in the branch prediction unit 230 to make predictions rather than information from other fetch blocks, it is decoupled to some degree from the rest of the pipeline. Hence, branch prediction may be performed independently of the instruction fetch process, allowing the fetch buffer 240 to be populated with fetch blocks predicted to be needed for a subsequent instruction fetch.

In one embodiment using a set-associative instruction cache 225, the branch prediction unit 230 provides a "way prediction" for the predicted fetch blocks. Way prediction is the prediction in which a "way" or set element of a set-associative cache a fetch block is stored. This prediction of memory locations conserves power and energy and further improves performance. A set associative cache is a structure where each group of consecutive locations (called a cache line) in memory 130 may be stored in more than one location in the instruction cache 225. Each cache line in the instruction cache (containing one or more fetch blocks) has an associated cache tag specifying the location of that cache line in memory 130. The multiple locations in the cache where a cache line can be stored together form a set. For instance in a 4-way set-associative cache each set has 4 elements or "ways." Hence, way prediction for a fetch block predicts the set element for the cache line that includes that fetch block.

Alternatively, the instruction fetch unit 110 uses a serialized access structure to access instructions in the instruction cache 225 or memory 130. In a serialized access structure, cache tags are checked for a match to an instruction prior to accessing the instruction cache 225. Thus, the serial access may be performed over two cycles, where the first cycle compares cache tags to tags representing an instruction (or fetch block being fetched as determined by the fetching address 260). The second cycle accesses and retrieves cache data after the confirmed cache tag comparison. For example, a tag is compared to all cache tags in a set (e.g. 4 tags in a 4-way set-associative cache) present in the instruction cache 225 during the first cycle. If the tag matches a cache tag, a location in the instruction cache 225 associated with the matching cache tag is accessed and an instruction is retrieved from the location in the instruction cache 225. However, if the tag does not match a cache tag in the instruction cache 225, then the required block of data is accessed from memory 130, and placed in the instruction cache 225.

Using two cycles to access memory 130 helps conserve energy, reduce processor power consumption, and reduce the number of entries in memory accessed before retrieving data. Using the serialized access method obviates a multi-bank structure used for a parallel set-associative cache by allowing instructions in a set or a way to be included in a single bank of memory. By using a single bank structure, the amount of area used to implement an instruction memory is also reduced. In one embodiment, two additional cycles are added to the serialized access method to provide for handling of mispredicts and to more smoothly compensate for instruction cache latency and restarts.

The instruction fetch unit 110 may use a combination of way prediction and serialized access to retrieve instructions from the instruction cache 225 or from memory 130 in some embodiments. For example, the branch prediction unit 230 generates predicted branch target addresses 235 and way predictions. For example, if the branch prediction unit 230, predicts that a fetch block includes a branch taken by an instruction in an instruction run, the branch prediction unit 230 provides the predicted branch target address 235 and a predicted way of the instruction cache 225 location addressed by the branch target address. The accuracy of predicting a way is similar to the accuracy of predicting a branch. If there is a way mispredict, the correct way is written to a branch cache, so it is accessible to the instruction fetch unit 110 as additional instructions are executed.

In one embodiment, the instruction fetch unit 110 initially accesses the instruction cache 225 to retrieve the predicted fetch block using the predicted way determined by the branch prediction unit 230. At the same time the instruction fetch unit 110 compares the tag associated with the predicted way with the address of the cache line that contains the predicted fetch block. If the tag matches, then the way prediction is correct and the retrieved fetch block is valid. If the tag doesn't match then the way prediction is incorrect, the retrieved fetch block invalid and the instruction cache 225 access is repeated using serialized access. As long as the way prediction is correct, fetch blocks can be retrieved in one cycle, thereby reducing memory latency.

In another embodiment, when a branch misprediction occurs, the instruction fetch unit 110 determines whether the way prediction for the other direction (i.e., an alternative way prediction) is known, and if so restarts instruction fetch by accessing the instruction cache in parallel mode using the alternative way prediction. Whether the alternative way is known or unknown may depend on the reason for the branch misprediction. For example, in some cases, a branch misprediction occurs because the direction of the branch is wrong, i.e. a branch predicted taken should really be not taken or vice versa a branch predicted not taken should really be taken. If the branch is predicted not taken, then the alternative way prediction is known because it is the way prediction for the taken branch. And the instruction fetch unit 110 may retrieve the way prediction for the taken branch from the branch cache when making the branch prediction to have it ready in case a taken prediction is made. Alternatively, when the branch is predicted taken, then the alternative way prediction is the way prediction for the "fall through" instruction, i.e. the next sequential instruction after the branch instruction (or after the delay slot instruction after the branch instruction if the branch has a delay slot). The way prediction for the next sequential instruction is typically the same way as the way of the branch instruction itself, because the branch instruction and the next sequential instruction are typically located next to each other in the same fetch block in memory. Thus, in this case, when a branch prediction is made, the instruction fetch unit 110 stores in a hardware queue if the alternative way prediction is known and if known what the alternative way prediction is, until resolved downstream in the pipeline as to whether the branch prediction is correct or not. If the branch prediction is incorrect because of a mispredicted direction, and the instruction fetch unit 110 knows the alternative way prediction, then the instruction fetch unit 110 restarts by accessing the instruction cache in parallel mode using the alternative way prediction In other cases, a branch misprediction occurs because the branch target address is incorrect for a branch that is taken. In other words, the branch is predicted taken and should be taken, but to a different address than predicted. In this case the way prediction is invalid (it was for the incorrect predicted branch target), and no alternative way prediction is known. In turn, mispredict handling logic included in the processor restarts the instruction fetch at the corrected branch target address using serialized mode. The branch cache gets updated with the corrected branch target address and way prediction for the corrected branch target address. The way for the corrected branch target address is known after checking the instruction cache tags for the corrected branch target address during the processor restart. That way for the corrected branch target address is added to the branch cache entry for the corrected branch target address as the new way prediction, i.e. we branch to the wrong location even when correctly predicting to take the branch.

In other cases, a branch misprediction occurs because there is a taken branch, but the branch cache doesn't have an entry for it and therefore there is no way prediction and no alternative way prediction. The mispredict handling logic, in turn, restarts the instruction fetch in serialized mode and updates the branch cache to store a prediction for that branch so it will be predicted in the future. Also the way for the taken branch gets added to the new branch cache entry after checking the instruction cache tags for the target of the new taken branch, to be used as way prediction for the new branch. And in other cases, a branch misprediction occurs when a branch is predicted for an instruction, but there is no branch instruction at that location in the program. In that case the mispredict handling logic restarts in serialized mode without way prediction. The branch cache gets updated to remove the erroneous branch prediction and its way prediction.

Hence, way prediction in combination with alternative way prediction may reduce the cycles used to access the instruction cache 225 to a single cycle in certain circumstances. If, however, a branch mispredict occurs and alternative way prediction is unknown, the instruction fetch unit 110 may use serialized instruction cache access to determine the correct instruction to retrieve.

Figure 4:
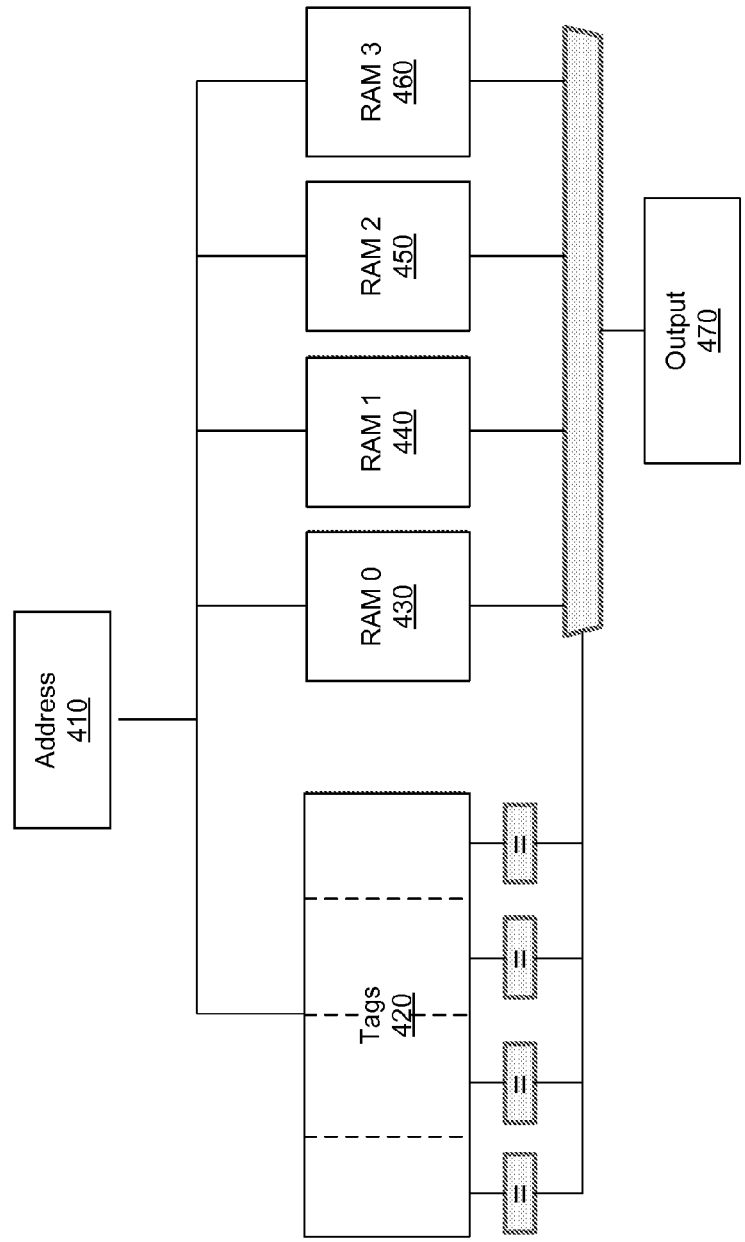
FIG. 4 is an example of a 4-way parallel set associative cache, according to one embodiment.
Figure 5:
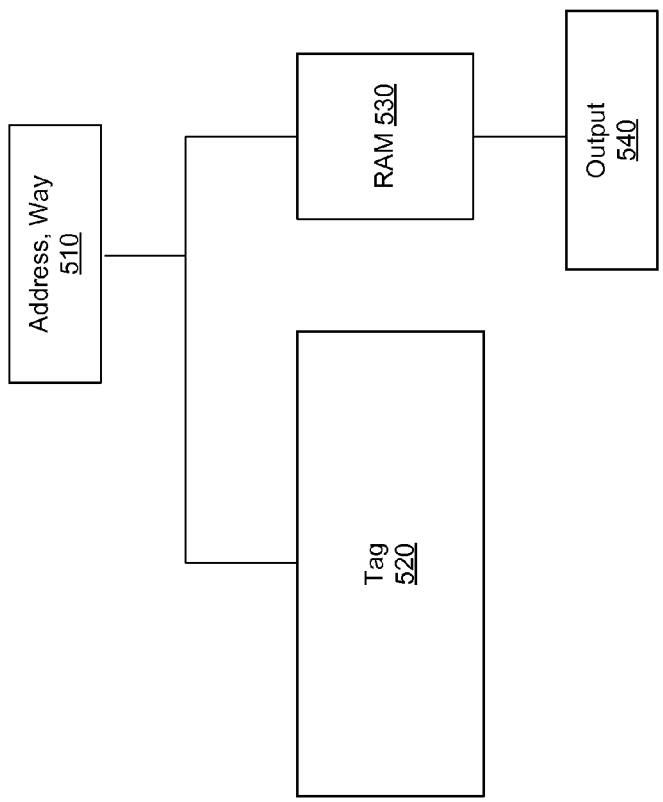
FIG. 5 is an example of a 4-way serialized and way predicted cache, according to one embodiment.

Comparing FIG. 4 and FIG. 5 shows differences in structural implementation of a 4-way parallel set associative cache 400 and a 4-way serialized and way predicted cache 500. FIG. 4 shows an example of a 4-way parallel set associative cache 400 including a tag component 420 and memory components 430, 440, 450, 460. Information related to the cache tags 420 associated with a particular instruction are retrieved from the fetch address 410. For the 4-way parallel set-associative cache 400, the tags are compared against each memory component 430, 440, 450, 460 to determine the correct fetch blocks or instructions to retrieve. The correct instructions are then output 470 for execution to the execution unit 120. FIG. 5 is an example of a 4-way serialized and way predicted cache 500 including a tag component 520 and a memory component 530. Information related to the cache tag 520 associated with a particular instruction are retrieved from the fetch address 510. When a way 510 is predicted, a single tag is compared to contents of the single memory component 530 to identify fetch blocks to be retrieved to execute instructions in an instruction run. The correct instructions are then output 540 for execution to the execution unit 120.

Figure 6:
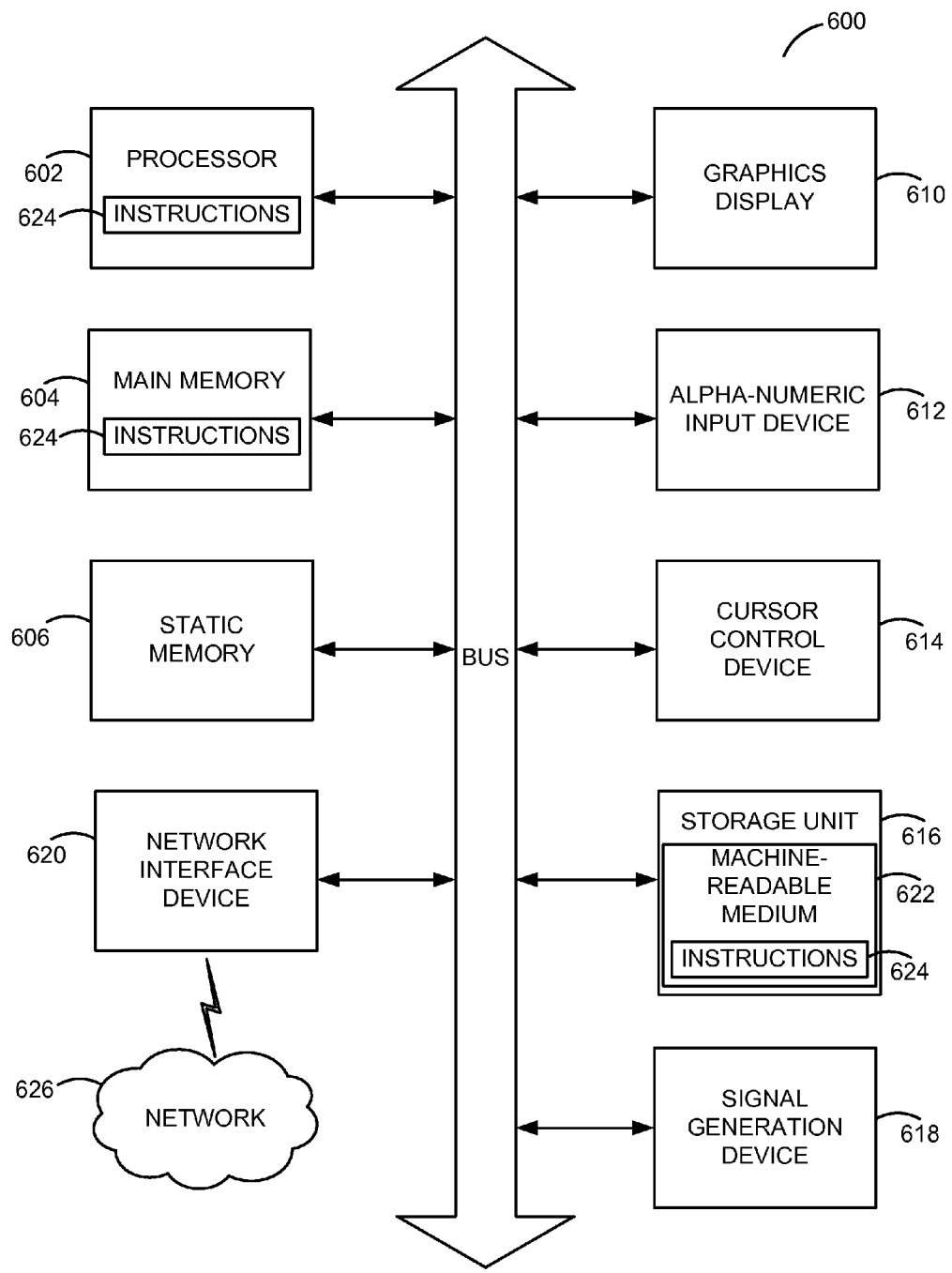
FIG. 6 is a block diagram illustrating components of an example machine able to read instructions from a machine-readable medium and execute them in a processor (or controller), according to one embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software) for causing the machine to perform any one or more of the methodologies discussed herein may be executed. The computer system 600 may be used to perform operations associated with designing a test circuit including a plurality of test core circuits arranged in a hierarchical manner.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620. The machine-readable medium 622 may also store a digital representation of a design of a test circuit.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-read-

SUMMARY

The foregoing description has been presented for the purpose of illustration; it is not intended to be exhaustive or to limit the embodiments to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting, in scope.

What is claimed is:

1. An integrated circuit comprising:
    an instruction cache comprising a plurality of fetch blocks, each fetch block of the plurality of fetch blocks associated with a location in the instruction cache and a cache tag identifying a location of the fetch block in memory;
    a branch prediction module, configured to generate a way prediction identifying a location in the instruction cache associated with a predicted fetch block and a cache tag associated with the predicted fetch block; and
    an instruction fetch unit configured to:
        retrieve, based on the way prediction, a first fetch block from the instruction cache located at the location identified by the way prediction;
        compare the cache tag associated with the retrieved first fetch block with the cache tag associated with the predicted fetch block; and
        validate, based on the comparison, that the retrieved first fetch block is the predicted fetch block predicted by the way prediction.

2. The integrated circuit of claim 1, wherein each fetch block comprises an instruction.

3. The integrated circuit of claim 1, wherein each fetch block comprises a portion of an instruction.

4. The integrated circuit of claim 1, wherein in a single clock cycle, the instruction fetch unit is configured to retrieve the first fetch block, compare the cache tag associated with the retrieved first fetch block with the cache tag associated with the predicted fetch block, and validate that the retrieved first fetch block is the predicted fetch block.

5. The integrated circuit of claim 1, wherein the instruction cache is a set associative instruction cache.

6. The integrated circuit of claim 5, wherein the plurality of fetch blocks associated with a set are in a same memory bank of the instruction cache.

7. A non-transitory computer readable medium storing instructions that when executed by a processor generate a representation of an electronic circuit, the electronic circuit comprising:
    an instruction cache comprising a plurality of fetch blocks, each fetch block of the plurality of fetch blocks associated with a location in the instruction cache and a cache tag identifying a location of the fetch block in memory;
    a branch prediction module, configured to generate a way prediction identifying a location in the instruction cache associated with a predicted fetch block and a cache tag associated with the predicted fetch block; and
    an instruction fetch unit configured to:
        retrieve, based on the way prediction, a first fetch block from the instruction cache located at the location identified by the way prediction;
        compare the cache tag associated with the retrieved first fetch block with the cache tag associated with the predicted fetch block; and
        validate, based on the comparison, that the retrieved first fetch block is the predicted fetch block predicted by the way prediction.

8. The non-transitory computer readable medium of claim 7, wherein each fetch block comprises an instruction.

9. The non-transitory computer readable medium of claim 7, wherein each fetch block comprises a portion of an instruction.

10. The non-transitory computer readable medium of claim 7, wherein in a single clock cycle, the instruction fetch unit is configured to retrieve the first fetch block, compare the cache tag associated with the retrieved first fetch block with the cache tag associated with the predicted fetch block, and validate that the retrieved first fetch block is the predicted fetch block.

11. The non-transitory computer readable medium of claim 6, wherein the instruction cache is a set associative instruction cache.

12. The non-transitory computer readable medium of claim 11, wherein the plurality of fetch blocks associated with a set are in a same memory bank of the instruction cache.

13. A method comprising:
    receiving a way prediction identifying a location in an instruction cache associated with a predicted fetch block and a cache tag associated with the predicted fetch block, the instruction cache comprising a plurality of fetch blocks, each fetch block associated with a location in the instruction cache and a cache tag identifying a location of the fetch block in memory;
    retrieving, based on the way prediction, a first fetch block from the instruction cache located at the location identified by the way prediction;
    comparing the cache tag associated with the retrieved first fetch block with the cache tag associated with the predicted fetch block; and
    validating, based on the comparison, that the retrieved first fetch block is the predicted fetch block predicted by the way prediction.

14. The method of claim 13, wherein each fetch block comprises an instruction.

15. The method of claim 13, wherein each fetch block comprises a portion of an instruction.

16. The method of claim 13, wherein the retrieving of the first fetch block, the comparing of the cache tag associated with the retrieved first fetch block with the cache tag associated with the predicted fetch block, and the validating that the retrieved first fetch block is the predicted fetch block are performed during a single clock cycle.

17. The method of claim 13, wherein the instruction cache is a set associative instruction cache.

18. The method of claim 17, wherein the plurality of fetch blocks associated with a set are in a same memory bank of the instruction cache.

19. An integrated circuit comprising:
- an instruction cache comprising a plurality of fetch blocks, each fetch block of the plurality of fetch blocks associated with a location in the instruction cache and a cache tag identifying a location of the fetch block in memory;
- a branch prediction module, configured to:
  - generate a branch prediction, a way prediction and an alternative way prediction, the way prediction identifying a location in the instruction cache associated with a predicted fetch block and a cache tag associated with the predicted fetch block, and the alternative way prediction identifying the predicted way in the instruction cache of a fetch block containing instructions associated with the opposite direction of the branch as the direction that is predicted;
- a storage device configured to store the alternative way prediction; and
- mispredict handling logic configured to:
  - detect a branch misprediction;
  - determine whether an alternative way prediction is available based on the detected branch misprediction, the alternative identifying another location in the instruction cache associated with the predicted fetch block and another cache tag associated with the predicted fetch block; and
  - access the instruction cache in parallel mode using the available alternative way prediction.

\* \* \* \* \*